May 10, 1932.  A. SCHOLZ ET AL  1,857,824
EMERGENCY KIT FOR AUTOMOBILES
Filed Feb. 9, 1929
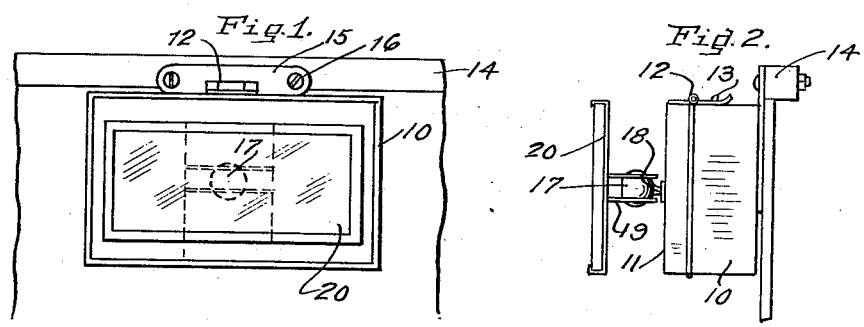
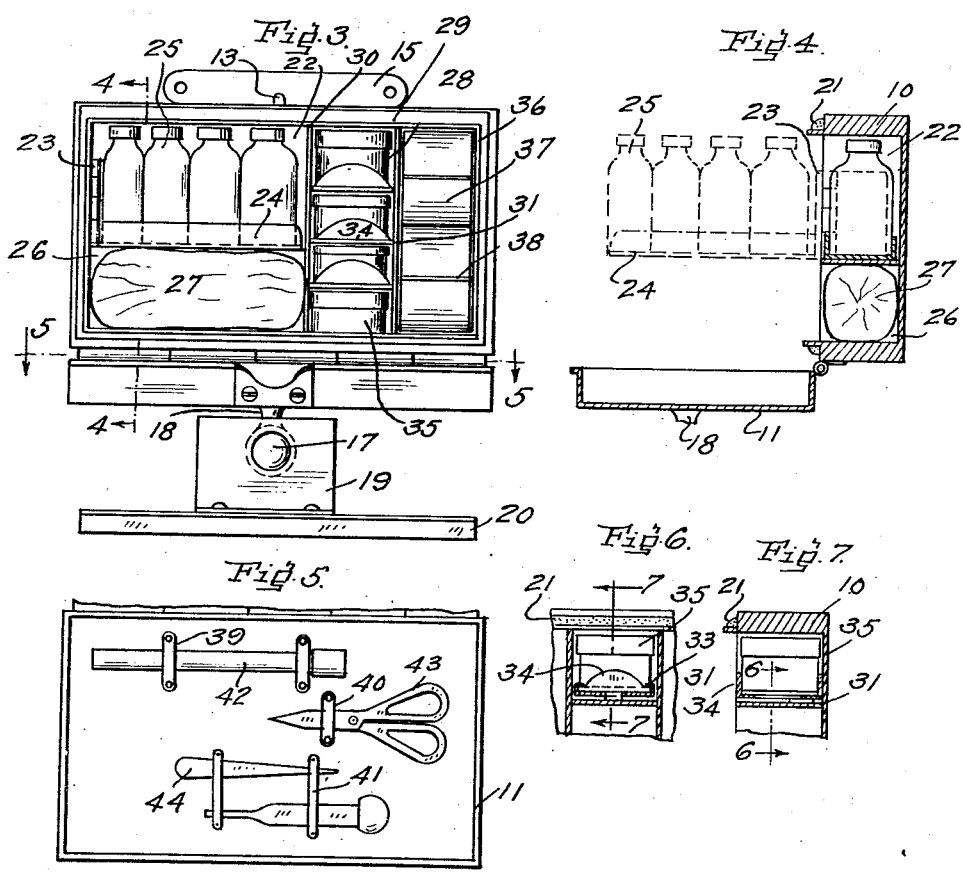
Inventors
Arthur Scholz
Henry Frucht
By their Attorney
George C. Heinrich Patented May 10, 1932

1,857,824

UNITED STATES PATENT OFFICE

ARTUR SCHOLZ AND HENRY FRUCHT, OF BROOKLYN, NEW YORK; SAID FRUCHT ASSIGNOR TO SAMUEL FELDSTEIN, OF BROOKLYN, NEW YORK

EMERGENCY KIT FOR AUTOMOBILES

Application filed February 9, 1929. Serial No. 338,716.

This invention relates to an emergency kit for automobiles or the like, and it is the principal object of our invention to provide an outfit for treating injuries sustained by the occupants of an automobile or the like vehicle while on the road.

It frequently occurs that automobile accidents happen in out of the way places where hospitals and doctors are not readily to be reached, and that such accidents lead to injuries of the occupants which should and must receive immediate or emergency treatment, in order to ward off serious consequences of such injuries, as for instance blood poison, dangerous loss of blood, etc., etc.

It is therefore another object of our invention to avoid all such dangerous delays in the treatment of injured persons by providing an emergency kit containing all the medicaments necessary to treat injuries medicinally immediately after the accident and a kit which is carried at a convenient place of the automobile.

A further object of our invention is the provision of an emergency kit which can be conveniently attached to or removed from the mirror holder of a car.

A still further object of our invention is the provision of an emergency kit allowing a ready access to the single medicaments by arranging the same on shelves and on trays allowing a ready withdrawal of any of the contents of the kit in emergency cases.

These and other objects and advantages of our invention will become more fully known as the description proceeds, and will then be specifically defined in the appended claims.

In the accompanying drawings forming a material part of this disclosure:

Fig. 1 is a fragmentary front elevation of an emergency kit constructed according to our invention attached to the mirror holder of an automobile.

Fig. 2 is an end view thereof.

Fig. 3 is a front elevation of the emergency kit, open and ready for use.

Fig. 4 is a cross-section on line 4—4 of Figure 3.

Fig. 5 is a fragmentary top plan view of the inner face of the lid for the emergency kit, seen in the direction of arrows 5—5 of Figure 3.

Fig. 6 is a sectional detail front elevation showing one of the compartments of the kit, the section being taken on line 6—6 of Figure 7.

Fig. 7 is a section on line 7—7 of Figure 6.

As illustrated on the drawings, the emergency kit is composed of a box 10 having a lid 11 hingedly secured thereto at its lower end while a hasp 12 at its upper edge is adapted to be engaged by a knob 13 on the box 10.

The box 10 is attached to a convenient part of the automobile so as to be in convenient reach for instance to the wind-shield frame 14 by means of a clamp member 15 or the like integral with the box and adapted to be secured to the frame 14 by any desired fastening means as for instance screws 16.

To the outer face of the lid in approximately the middle thereof is attached a ball head 17 by a neck 18 adapted to be engaged by a bracket 19 having rounded recesses therein into which the head 17 engages and allows a swivel motion of the bracket.

The bracket 19 is attached to the rear face of an automobile mirror 20.

In order to protect the box against humidity, dust, etc., a rubber strip 21 is provided on the seat for the lid on said box.

The interior of the box 10 is divided by suitable partitions into a plurality of compartments. A comparatively large compartment 22 has hingedly connected to the outer side edge thereof, as at 23, a tray 24 adapted to be swung laterally into and out of the compartment 22 and adapted to support a number of small bottles 25 containing liquid medicaments as for instance, iodine, aromatic spirits, argyrol, collodion or the like, while a lower, smaller compartment 26, contains a supply of absorbent cotton or the like, designated 27. A compartment 28 is formed in juxtaposition to compartments 22 and 26 by partitions 29 and 30 and divided into a plurality of small superposed sections by cross-partitions 31 on which trays 32 slide in suitable guides 33.

Said trays have at their front ends upturned handles 34 for the convenient operation of the trays and the boxes 35 supported thereby and containing for instance adhesive plaster, rubber fingers, aspirin tables, midol etc., and at their rear ends abutment strips.

An end compartment 36 is adapted to hold bandages 37 or the like held in place by suitable braces 38.

The inner face of the lid 11 has a plurality of guide straps 39, 40, 41, secured thereon for holding a glass 42 containing wadded sticks, or a pair of scissors 43, pincers 44, dropper 45, or the like.

The operation of our device will be entirely clear from the above description and simultaneous inspection of the drawings, and it will be clear that we have invented a new and useful emergency kit for automobiles, which is at all times ready for instantaneous use so that injuries sustained during an accident can be treated on the spot, especially if the location is remote from hospitals and doctors, and thus serious consequences can be avoided and many lives saved which heretofore were lost on account of delay in treatment causing bleeding to death or blood poisoning etc.

It will be understood that we have shown and described the preferred form of our device only as an example of the many possibilities to practically construct the same, and that we make such changes in the general arrangement and in the construction of the minor details thereof as come within the scope of the appended claims without departure from the gist of our invention and the principles involved.

Having thus described our invention, what we claim as new and desire to secure by Letters Patent is:

1. In an emergency kit particularly for automobiles, partitions dividing said kit into a plurality of compartments, cross-partitions dividing some of said compartments into a plurality of small superposed sections, guides in said sections, trays sliding in said guides, upturned handles at the front of said trays, and abutment strips at the rear ends of said trays, said trays adapted to support boxes, means for swinging one compartment laterally into and out of said kit, and a means for providing a moisture and dust-proof closure for the kit.

2. In an emergency kit, particularly for automobiles, partitions dividing said kit into a plurality of compartments, guides in one of said compartments, trays sliding in said guides, supporting boxes, and upturned handles on the front of said trays for the convenient operation of said trays to move the boxes in and out of said compartment.

Signed at New York, in the county of New York and State of New York, this 31st day of January, A. D. 1929.

ARTUR SCHOLZ.
HENRY FRUCHT.